| United States Patent [19] | [11] | 4,365,510 |
|---|---|---|
| Imhof et al. | [45] | Dec. 28, 1982 |

[54] METHOD AND DEVICE FOR MEASURING THE HEIGHT OF AT LEAST ONE SEPARATION LAYER IN THE MATERIAL BED OF A DENSITY SORTING MACHINE

[75] Inventors: Rainer Imhof, St. Augustin; Wolf-Diethard Grünberg, Bergisch Gladbach; Karl-Heinz Unkelbach, Cologne, all of Fed. Rep. of Germany

[73] Assignee: Klöckner-Humboldt-Deutz AG, Fed. Rep. of Germany

[21] Appl. No.: 206,958

[22] Filed: Nov. 14, 1980

[30] Foreign Application Priority Data

Nov. 19, 1979 [DE] Fed. Rep. of Germany ....... 2946605

[51] Int. Cl.³ .................... G01N 9/12; G01F 23/10
[52] U.S. Cl. .................................. 73/313; 73/322.5
[58] Field of Search .............. 73/305, 311, 313, 322.5, 73/453, 290 R, 309, 314, 319; 209/18

[56] References Cited

U.S. PATENT DOCUMENTS

| 2,298,954 | 10/1942 | Marchment | 73/313 X |
| 2,357,745 | 9/1944 | Kliever | 73/313 X |
| 2,506,585 | 5/1950 | Elliott | 73/313 X |
| 3,170,325 | 2/1965 | Sinclair | 73/322.5 X |
| 3,994,174 | 11/1976 | Ekman et al. | 73/453 |
| 4,080,828 | 3/1978 | Akita et al. | 73/313 X |

*Primary Examiner*—James J. Gill
*Attorney, Agent, or Firm*—Hill, Van Santen, Steadman, Chiara & Simpson

[57] ABSTRACT

A method and apparatus for measuring the height of the density layer in a material bed layered according to densities, such as in a jigging machine operation, utilizes a free-floating measuring body having a transmitter means embedded therein and a probe mechanism for monitoring the relative position of the body in the material bed. The measuring body is made of a material having a density equal to the relative densities of materials forming the separating line between two density levels and is able to move with the materials during the grading process. The probe mechanism is housed in a guide tube which extends in the direction of the density gradient through the material bed.

14 Claims, 1 Drawing Figure

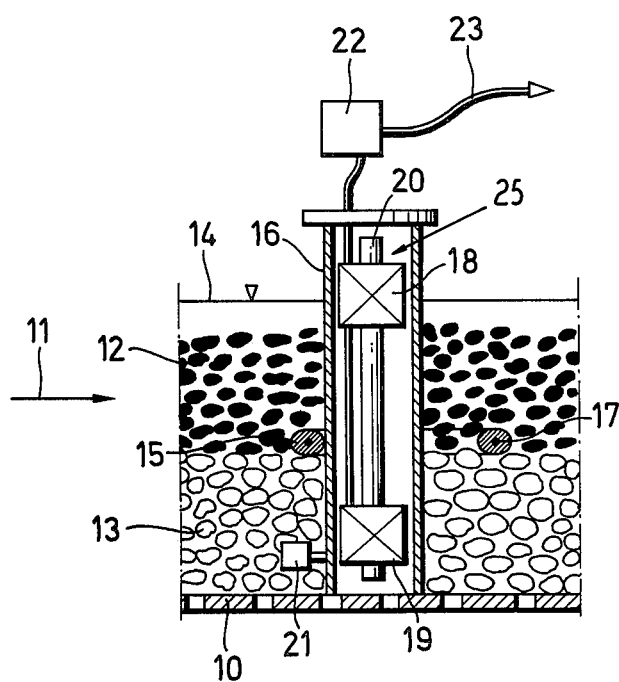

METHOD AND DEVICE FOR MEASURING THE HEIGHT OF AT LEAST ONE SEPARATION LAYER IN THE MATERIAL BED OF A DENSITY SORTING MACHINE

BACKGROUND OF THE INVENTION

1. Field of the Invention

The invention relates to a method and apparatus for measuring the height of at least one density layer in the material bed of a density sorting machine, particularly a jigging machine for processing mineral or solid mixtures.

2. The Prior Art

Density grading machines, such as jigging machines, are utilized to sort solid mixtures based on relative densities of material. Typically, a jigging machine receives a supply of solid material in a jig bed which is mechanically vibrated or jiggled in order to displace heavier particles towards lower levels of the material or jig bed.

In a jigging machine for sorting wet mineral mixtures, particularly raw clean coal, German OS No. 2734736 describes means for measuring the relative height of the layer of heavy materials in a jig bed using a flotation element. The heavy materials are discharged from the jig bed responsive to float height enabling a through-flow of heavy materials. The float is a hollow body of a large size compared to the particles in the jig bed and carries a transmission rod extending vertically upward from the upper surface of the float. The transmission rod maintains the float on a vertical path and its height allows an observer to determine the layer height of heavy materials in the jig bed. In this arrangement, however, the float behaves only approximately like the jigged material itself. Changes in material density along the height of the jig bed are not immediately and precisely registered by the float, which can result in faulty measurements and ill-timed discharges.

Furthermore, this float arrangement is not well-suited to measure the boundary layer between layers of coal which exhibit only slight differences in density among the particles. Without the necessary precision, misplaced materials could arise in situations having a separate discharge of the coal layers. A hollow body float construction is also subject to wear, such that its overall density may change thus producing inaccurate layer height readings from the jig bed.

The present invention is drawn to an apparatus and method which overcomes these disadvantages with a simple device for determining precisely where layers of only slight density differences are separated.

SUMMARY OF THE INVENTION

For determining the height of a density layer in the material bed of a jigging machine, a measuring body is utilized which is small in comparison to the height of the jig bed, at least in the direction of the material density gradient of the bed, and which floats freely in the jig bed in the direction of this density gradient. The measuring body is constructed with a relatively flat profile and of the density of the jig material for which level in the jig bed the body is measuring. Consequently, the measuring body behaves like the freely mobile jigging matter during the jigging or grading process, so as to obtain a very precise layer level measurement which is free of inertia and which, due to its free-floating arrangement, is not disturbed by any kind of transmission device. The measuring body is arranged in a generally circular form concentrically, but without being connected to, a guide tube vertically disposed in the jig bed in the direction of the density gradient. The guide tube houses a probe means for monitoring relative movement in the jig bed of the measuring body. The probe means comprises an attenuated oscillatory circuit which produces varying signal responses as a function of relative positioning of a transmitter means built into the measuring body.

The measuring body preferably has an approximately uniform density distribution so that wear changes to the body volume do not produce a change in density and measuring reliability. The material of the measuring body is preferably of a nature as to be abrasion-proof and insensitive to external influences such as water or the like.

BRIEF DESCRIPTION OF THE DRAWING

The single FIGURE is a schematic cross-sectional side elevational view of a jig bed having a density layer measurement system in accordance with the present invention.

DESCRIPTION OF THE PREFERRED EMBODIMENT

For purposes of illustrating the present invention, the FIGURE shows a jig bed having a material carrier 10 in a wet jigging machine for grading raw clean coal, wherein the coal material is conveyed onto the carrier from the left in the direction of arrow 11. An upper layer 12 is formed of lighter coal particles and a lower layer 13 exhibits middle range and heavy materials or deads as a result of the jigging operation. A water level in the jig bed is indicated by line 14.

A level measuring body 15 is formed of a generally solid material cross-section in the form of a generally circular or toroidal shape. The body 15 is free floating in the direction of the vertical density gradient formed by the material carrier 10 and is shown here, for the purposes of illustration, as floating along the boundary layer on the top of the layer 13 of deads formed in the jig bed. The measuring body is of a density comparable with the density level existing at this location in the jig bed, for example 1.4 kg/dm$^3$, wherein the densities of material increases rapidly beneath the level of the measuring body. The height of the measuring body 15 in the jig bed occurs at the level of the densest packing of materials having a density equal to or less than the specific weight of the measuring body. The body 15 is made of a wear-resistant material, such as a synthetic resin having a generally uniform density distribution so that volume changes due to erosion of the measuring body do not result in changes in the density thereof.

Extending vertically in the jig bed in the direction of the density gradient and disposed on the bottom wall surface of the material carrier 10 is a guide tube element 16. The measuring body is coaxial with the guide tube and extends concentrically therearound in free-floating relation. The inner diameter of the measuring body ring is many times the diameter of material particles being graded in the jig bed so that material being graded can pass without restriction from one side of the body 15 to the other in the direction of the density gradient and in the direction 11 of incoming flow and so that the measuring body does not necessarily engage against the guide tube housing. The guide tube element 16 may be equipped with a mechanical vibrator 21 or the like to inhibit adherence of the measuring body 15 or particles of material being graded to the outer surface of the tube housing.

The tube element 16 houses a probe mechanism 25 for monitoring the relative position of the measuring body 15. The probe comprises a ferrite core rod 20 extending coaxially with the tube 16 and having coil members 18 and 19 fitted thereon adjacent opposed ends of the core rod. The coils 18 and 19 serve as part of an attenuated or detuned oscillatory electrical circuit (not illustrated). The measuring body 15 includes a transmitter means in the form of a ring 17 built into the body and formed of an electrically conductive material which closely matches the overall density of the measuring body. In this regard, the measuring body can itself completely consist of an electrically conductive material insofar as that material exhibits the desired density. The oscillatory circuit is affected by the relative position of the electrically conductive ring 17 in relation thereto. This produces a signal response by which one obtains an indication which precisely corresponds to the respective height of the measuring element in the jig bed and, thus, precisely corresponds to the respective density boundary level being measured by the body 15.

The probe circuit is connected to a transducer 22, which generates a signal indicating an actual height or distance of the measuring element ring 17 from one of the coils 18 or 19. This signal is transmitted through a line 23 to a control means for operating a discharge device for releasing a density layer of materials from the jig bed. For example, the discharge device may be operated for the removal of the deads layer 13.

It is within the contemplation of the present invention that types of position locater schemes other than that described above may be utilized. For example, the measuring body may contain a permanent magnet with a corresponding probe mechanism affected by magnetic attraction fitted in the guide tube housing 16. The body 15 may also contain a radio transmitter or a radioactive isotope and a corresponding detector for the probe mechanism 25. In every instance, however, a control means for operating a discharge device for the withdrawal of jig bed materials graded into a particular density layer is preferably operated automatically from the output of the signal coming from generator 22.

It is further within the contemplation of the present invention that a plurality of measuring bodies having different densities may be arranged one above the other for interaction with the probe mechanism 25. The relative positions of the different measuring bodies would supply position values enabling a precise, controlled, separate withdrawal of different density levels produced in the jig bed, for example for the withdrawal of coal fractions. Outlet apertures for discharge devices for the respective density levels may be adapted with gates controllably opened with respect to different occurring material amounts indicated by the different level heights determined from the different positions of the relative measuring bodies in the jig bed. Jig beds may be provided with a plurality of associated measuring bodies and guide tube and probe devices located at various points in the jig bed, so that corresponding signals from their generators 22 may be compared. Evaluation devices making such comparisons may be used to control the material discharge devices on the basis of an average reading or a critical level reading or the like.

The present invention is particularly well-suited for fine grain materials being separated in jigging machines.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for use in a density grading machine having a bed containing solids material and a predetermined range of densities to detect the height of a boundary layer between materials of different densities within the bed comprising:
   a measuring body having a generally solid cross section and an overall density substantially equal to the density of material along said boundary layer and being free floating in said bed;
   a transmitter means embedded in said measuring body;
   said measuring body having a generally uniform density distribution and said transmitter means having a density substantially equal to the density of said measuring body;
   a probe mechanism for monitoring the relative position of said measuring body in said bed; and
   housing means for said probe disposed in said bed in the direction of the density gradient therein.

2. The apparatus of claim 1, wherein said material is coal.

3. The apparatus of claim 1, wherein said material is a mixture of solid minerals.

4. The apparatus of claim 1, wherein said measuring body has a profile which is small relative to the height of said material bed.

5. The apparatus of claim 1, wherein said measuring body is generally ring-shaped and positioned coaxially and generally concentric with said housing means, said measuring body ring having an inner diameter cross section substantially greater than the cross section of said housing means.

6. The apparatus of claim 5, wherein said measuring body ring is toroidal.

7. The apparatus of claim 1, said measuring body is made of a resinous material, said transmitter means is made of an electrically conductive material, and said probe mechanism comprises an oscillatory electrical circuit.

8. The apparatus of claim 1, wherein said measuring body and said transmitter means define a single element.

9. The apparatus of claim 8, wherein said single element is a permanent magnet.

10. The apparatus of claim 8, wherein said single element is made of electrically conductive material.

11. The apparatus of claim 1, wherein said transmitter means comprises a permanent magnet.

12. The apparatus of claim 1, wherein said transmitter means comprises a radio active isotope material.

13. The apparatus of claim 1, wherein said transmitter means is an electrically conductive material and said probe mechanism comprises two spaced-apart coils interconnected in an oscillatory electrical circuit, said circuit being variably attenuated responsive to distance in the direction of the density gradient between said measuring body and at least one of said coils.

14. The apparatus of claim 13, further comprising a transducer means connected to said oscillatory circuit for generating a signal indicative of the relative positioning of said measuring body in said material bed responsive to attenuation in said oscillatory circuit.

* * * * *